(12) United States Patent
Steiner

(10) Patent No.: US 6,591,180 B1
(45) Date of Patent: Jul. 8, 2003

(54) METHOD AND CONTROL SYSTEM FOR DISTANCE AND SPEED CONTROL OF A VEHICLE

(75) Inventor: Manfred Steiner, Winnenden (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/620,788

(22) Filed: Jul. 21, 2000

(30) Foreign Application Priority Data

Aug. 11, 1999 (DE) .......................................... 199 37 942

(51) Int. Cl.$^7$ ................................................ B60Q 1/00
(52) U.S. Cl. ...................... 701/96; 701/301; 701/205; 340/903; 340/435; 342/70; 342/106; 180/179
(58) Field of Search ............................ 701/96, 93, 301, 701/300, 205; 340/903, 904, 435, 436, 942, 902, 444, 441, 467, 465; 180/170, 167, 169, 179; 342/70, 71, 72, 106, 455, 29, 104, 109; 123/352

(56) References Cited

U.S. PATENT DOCUMENTS

| | | | | |
|---|---|---|---|---|
| 5,420,792 A | * | 5/1995 | Butsuen et al. ............... 701/93 |
| 5,574,644 A | * | 11/1996 | Butsuen et al. ............... 701/70 |
| 5,629,669 A | * | 5/1997 | Asano et al. ................ 340/436 |
| 5,808,561 A | * | 9/1998 | Kinoshita et al. ........... 340/903 |
| 5,904,215 A | * | 5/1999 | Ikeda ........................... 180/169 |
| 5,938,714 A | * | 8/1999 | Satonaka ...................... 701/96 |
| 6,058,347 A | * | 5/2000 | Yamamura et al. ........... 701/96 |
| 6,134,497 A | * | 10/2000 | Hayashi et al. .............. 701/70 |
| 6,188,950 B1 | * | 2/2001 | Tsutsumi et al. ............. 701/96 |
| 6,294,987 B1 | * | 9/2001 | Matsuda et al. ............ 340/436 |

FOREIGN PATENT DOCUMENTS

| | | |
|---|---|---|
| DE | 43 28 304 A1 | 3/1994 |
| DE | 44 07 082 A1 | 9/1994 |
| DE | 198 12 316 A1 | 10/1998 |
| DE | 198 27 445 A1 | 12/1998 |
| JP | 7144588 A * | 6/1995 |

* cited by examiner

Primary Examiner—Thomas G. Black
Assistant Examiner—Tuan L To
(74) Attorney, Agent, or Firm—Crowell & Moring LLP

(57) ABSTRACT

In a method for controlling the distance and/or the speed of a following vehicle running behind a leading vehicle, the distance between the following vehicle and leading vehicle is measured, and the speeds of the following vehicle and of the leading vehicle are measured, in the event of undershooting a minimum distance and/or in the event of overshooting a minimum speed difference a desired deceleration is determined for the following vehicle and automatic actuation of the vehicle brake on the following vehicle is initiated. The automatic actuation of the vehicle brake is triggered only for the case in which the absolute value of the desired deceleration overshoots a threshold value.

17 Claims, 1 Drawing Sheet

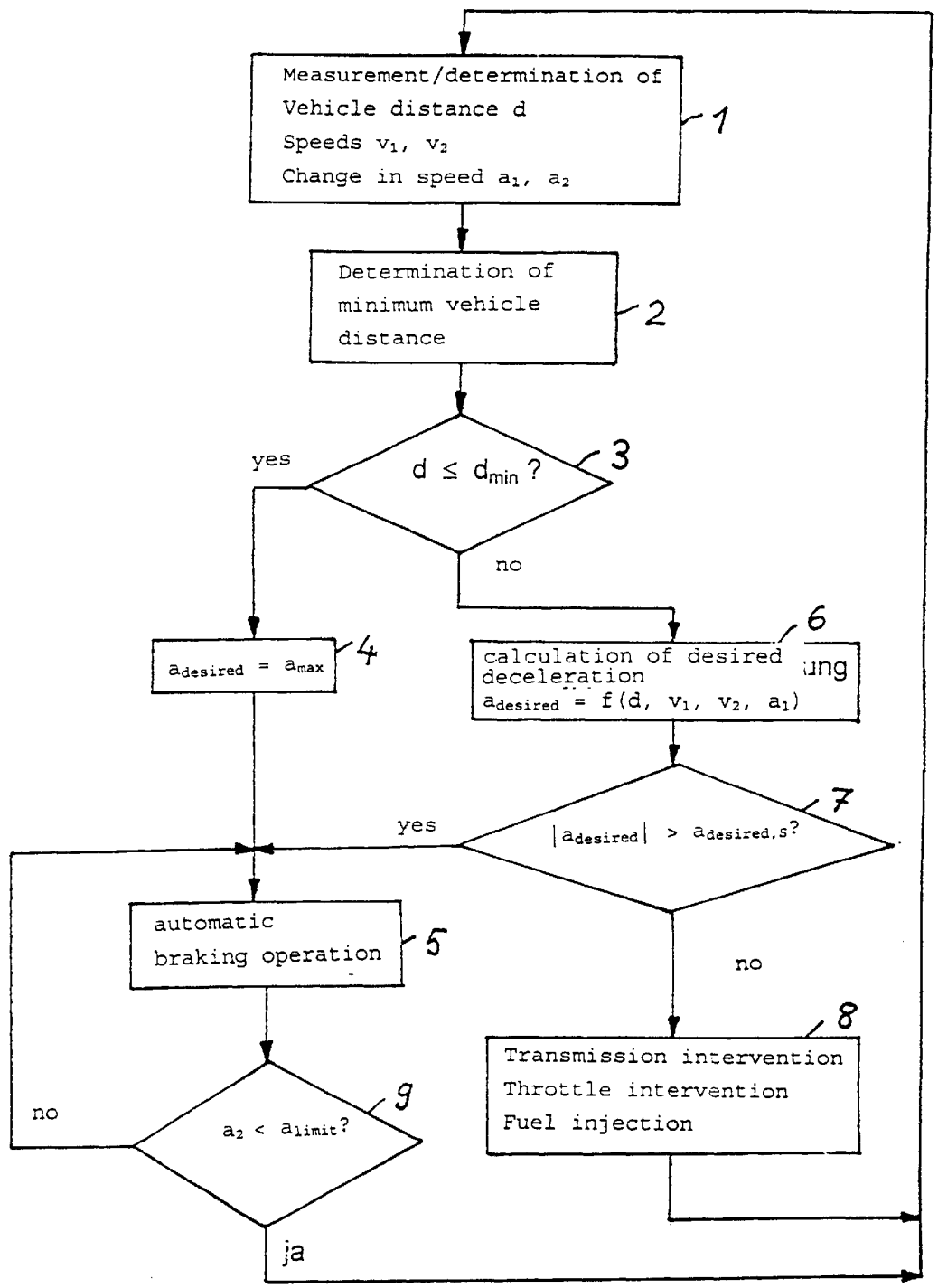

METHOD AND CONTROL SYSTEM FOR DISTANCE AND SPEED CONTROL OF A VEHICLE

BACKGROUND AND SUMMARY OF THE INVENTION

The invention relates to a method and a control system for distance and speed control of a vehicle according to the preamble of Claims 1 and 16, respectively.

The printed publication German Patent DE 44 07 082 A1 discloses a vehicle speed control system for setting the speed of a vehicle following a vehicle driving in front. Actuating signals for adjusting the transmission and the throttle are generated, as a function of the distance and the relative speed, in a regulation and control unit of the system in order to influence the torque which can be transmitted onto the road, as a result of which the distance between the controlled vehicle and the vehicle driving in front can be regulated.

The generically determinative printed publication German Patent DE 43 28 304 A1 discloses a control system for an automatic brake for an automobile, which has a measuring device for determining the relative distance between the leading vehicle and the following vehicle, and for measuring the speeds of both vehicles. On the basis of these measured values, a statement on whether there is a risk of collision between the following vehicle and the leading vehicle is made in a computing unit of the control system in accordance with a stored combinatorial rule. In this case, a desired deceleration is determined for the following vehicle and is converted into a corresponding brake pressure for braking the vehicle, in order to prevent a collision between the vehicles.

The problem on which this invention is based is to set the distance and/or the relative speed of a following vehicle in relation to a vehicle driving in front in a controlled fashion.

This problem is solved according to the invention with the aid of the features of Claims 1 and 16, respectively.

It is provided in accordance with the innovation that firstly, as a function of the distance between the vehicles and/or the speed difference, a desired deceleration is determined which the following vehicle is to run through in order to preserve a predetermined distance and/or to reserve a permitted speed difference. However, the desired deceleration is converted into an automatic braking operation only if the absolute value of the desired deceleration overshoots a threshold value which is fixed as a positive value. The introduction of a threshold value, and the comparison of the calculated desired deceleration with the threshold value ensure that the automatic actuation of the vehicle brake, and the higher vehicle deceleration associated therewith are carried out only in those cases in which adaptation of the speed and/or the distance cannot be realized, or can be realized only with insufficient reliability using other means. The value of the desired deceleration offers a reliable indication for deciding whether automatic actuation of the vehicle brake is required.

A further advantage of this method resides in the fact that the automatic actuation of the vehicle brake can be cancelled at any time as soon as a condition that the absolute value of the desired deceleration overshoots an associated threshold value is no longer fulfilled, with the result that the desired deceleration required for braking the vehicle can be achieved with other means which exhibit a softer braking response with a higher degree comfort. The harder braking response by actuating the vehicle brake is reserved for the critical situations.

For the case when the absolute value of the desired deceleration is below the threshold value, it is expedient for the vehicle deceleration to be implemented via transmission intervention and/or engine torque intervention. Such vehicle interventions, for example automated changing down into a lower gear, automated interventions in the throttle position or influencing of the fuel injection, can be carried out using already existing speed and distance control systems which can advantageously be incorporated into the novel control system.

For the case in which an automatic braking operation is required because of overshooting of the threshold value, the braking operation is preferably to be maintained until a limit value of the cyclically determined desired deceleration has been reached, the limit value being smaller in absolute value than the threshold value, with the result that the automatic braking operation for braking the vehicle to a lower speed is firstly maintained, and subsequently a further deceleration is carried out, for example by transmission interventions or engine torque interventions.

The desired deceleration is advantageously calculated as a function of the vehicle distance, the differential speed and the change in speed of the vehicle driving in front. The speed difference preferably features quadratically in the calculation of the desired deceleration, and thereby experiences a stronger weighting. The change in speed of the leading vehicle expediently enters linearly into the computer rule for the desired deceleration, whereas the vehicle distance enters reciprocally, in order to ensure that small distances result in a high vehicle deceleration.

In a preferred development, it is provided that, for the case in which the vehicle distance undershoots a lower limit value, the desired deceleration is set to a constant maximum value which is above the values of the desired deceleration determined using the computing rule. The aim is to ensure thereby that in the case of relatively small vehicle distances the vehicle deceleration is set to a maximum value in order to brake the vehicle as quickly as possible and to enlarge the vehicle distance. The lower vehicle distance limit value is a function, in particular, of the speed of the leading vehicle, a linear relationship preferably being selected such that with increasing speed of the leading vehicle the lower limit value rises proportionally.

The automatic actuation of the vehicle brake is advantageously performed independently of a brake actuation produced by the driver, in order to ensure that in the case of an inadequate brake actuation by the driver the required vehicle deceleration can automatically be achieved via the control system. For this design, in particular, already existing braking assistance systems can be integrated into the control system according to the invention in addition, or as an alternative to distance control and/or speed control systems.

Further advantages and expedient embodiments may be gathered from the description of the figures and the drawing, which illustrates a flowchart with the method steps for a control system according to the invention for distance and speed control of a vehicle.

BRIEF DESCRIPTION OF THE DRAWINGS

The sole FIGURE is a flowchart of the speed control system of the present invention.

DETAILED DESCRIPTION OF THE PREFERRED EMBODIMENT

In accordance with the flowchart, in a first method step 1 the vehicle distance d and the speeds $v_1$ and $v_2$ of the leading vehicle and the following vehicle are measured, and the change in speed $a_1$ of the leading vehicle and the change in speed $a_2$ of the following vehicle are determined from successive measurements of speed values of the two vehicles. In the following method step 2, a minimum vehicle distance $d_{min}$, which characterizes a lower, permissible limit value of the vehicle distance, is calculated as a function of the speed $v_1$ of the leading vehicle. The minimum vehicle distance can expediently be represented as a linear function of the speed $v_1$ of the leading vehicle, and is calculated in accordance with the relationship $$d_{min} = k_1 * v_1 + k_2$$

$k_1$ and $k_2$ denoting constants.

Method step 3 interrogates whether the actual vehicle distance d is smaller than or is equal to the minimum vehicle distance $d_{min}$. If the vehicle distance undershoots the permissible lower limit value $d_{min}$ (yes branch), the process moves on to method step 4 in which a desired deceleration $a_{desired}$ of the following vehicle is set to a constant maximum value $a_{max}$, the aim being to preserve the desired deceleration, as a desired variable which is to be preserved, in a braking operation, automatically initiated and carried out, in accordance with method step 5 by applying the vehicle brakes.

If the result of the interrogation in method step 3 is that the actual vehicle distance d is greater than the permitted minimum vehicle distance $d_{min}$, in accordance with the no branch the process moves on to method step 6 in which the desired deceleration $a_{desired}$ is calculated as a function of various state variables and parameters both of the leading vehicle and of the following vehicle.

It can be expedient in the case of an actual distance d which overshoots the minimum vehicle distance $d_{min}$ additionally to check in method step 6 before calculating the desired deceleration $a_{desired}$ whether the speed $v_2$ of the following vehicle overshoots the speed $v_1$ of the leading vehicle. If this is not the case, the sequence is advantageously truncated and a return is made to method step 1.

In method step 6, the current desired deceleration $a_{desired}$ is determined as a function of vehicle state variables, the desired deceleration being updated in computing steps which are to be traversed cyclically. The desired deceleration $a_{desired}$ is a function, in particular, of vehicle distance d, of the speed $v_1$ of the leading vehicle, of the speed $v_2$ of the following vehicle and of the change in speed $a_1$ of the leading vehicle. The desired deceleration is advantageously calculated in accordance with the relationship $$a_{desired} = (v_2 - V_1)^2 / d_{nominal} - d) + a_1 + C,$$

$d_{nominal}$ denoting a nominal distance which can be prescribed or can be determined as a function, and C denoting a constant. The nominal distance $d_{nominal}$ is preferably equated to the lower vehicle distance limit value $d_{min}$.

After the calculation of the desired deceleration, it is checked in the following method step 7 whether the absolute value of the desired deceleration $a_{desired}$ overshoots a threshold value $a_{desired,S}$. It is possible by prescribing a threshold value to distinguish for the desired deceleration $a_{desired}$ various ranges which are respectively assigned different interventions in vehicle components of the motor vehicle in order to influence the torque which can be transmitted to the road. For the case in which the absolute value of the calculated desired deceleration $a_{desired}$ is not greater than the threshold value $a_{desired,S}$ (no branch), the process moves on to method step 8, in accordance with which it is not a braking intervention that is undertaken, but a transmission intervention, a throttle intervention or an intervention in the fuel injection as well as, if appropriate, in further components of the motor vehicle which are not assigned the brake system. Such an intervention outside the brake system is advantageously performed only for the case in which the aim is to carry out in the following vehicle a conversion of a relatively small desired deceleration which can be carried out without risk using interventions which brake less strongly.

The intervention in a component situated outside the brake system is expediently continued until the minimum distance $d_{min}$ to be preserved or, if appropriate, the prescribed speed of the following vehicle is reached. Thereupon, the flowchart is traversed in a new cycle.

If it is established in method step 7 that the absolute value of the desired deceleration $a_{desired}$ is greater than the prescribed threshold value $a_{desired,S}$ (yes branch), the process moves on to method step 5 and an automatic braking operation is initiated in which the vehicle brake is activated by the control system. The activation of the vehicle brake is performed in such a way as to build up a controlled brake pressure which converts the desired deceleration into an actual vehicle deceleration.

The automatic braking operation can start independently of a braking actuation triggered by the driver, with the result that it is possible, in particular, also for the case to occur in which the brake pressure produced by the driver is amplified in the automatic braking operation so that the desired deceleration $a_{desired}$ can be preserved, it being possible to provide the desired deceleration $a_{desired}$ both, in accordance with method step 6, as a value which is a function of state variables and can be updated cyclically, and as a maximum value in accordance with method step 4.

As represented in method step 9, it is checked as truncation condition for the automatic braking operation whether the actual deceleration $a_2$ of the following vehicle undershoots a prescribed deceleration limit value $a_{limit}$, it being possible to take into consideration as additional condition that the undershooting must be maintained over a minimum time interval. If the conditions are fulfilled, a return is made, in accordance with the yes branch to method step 1 for renewed traversing of the flowchart. Otherwise, a return is made, in accordance with the no branch, to method step 5, and the automatic braking operation is continued.

Further advantages and expedient embodiments may be gathered from the further claims, the description of the figures and the drawing, which illustrates a flowchart with the method steps for a control system according to the invention for distance and speed control of a vehicle.

What is claimed is:

1. A method for controlling one of a distance and a speed of a following vehicle running behind a leading vehicle, comprising the steps of:
   measuring a distance between the following vehicle and the leading vehicle;
   measuring the speed of the following vehicle and the speed of the leading vehicle;
   providing a predetermined one of a minimum distance and a minimum speed difference between the following and leading vehicle;
   determining a desired deceleration for the following vehicle for use when one of the distance between the following vehicle and the leading vehicle is less than said minimum distance and when a difference in speed between the following vehicle and the leading vehicle is greater than said minimum speed;

automatic actuation of the vehicle brake only when an absolute value of the desired deceleration exceeds a predetermined threshold value of deceleration.

2. The method according to claim 1, wherein when the absolute value of the desired deceleration ($a_{desired}$) undershoots the threshold value ($a_{desired,S}$), the vehicle deceleration is implemented via transmission interventions and/or engine torque interventions.

3. The method according to claim 1, wherein the automatic braking operation is maintained at least until a limit value ($a_{limit}$) of the desired deceleration is reached.

4. The method according to claim 3, wherein the limit value ($a_{limit}$) of the desired deceleration must be maintained for a prescribed time interval in order to terminate the automatic braking operation.

5. The method according to claim 1, wherein the desired deceleration ($a_{desired}$) can be represented as a function of the square of the speed difference ($v_2-v_1$).

6. The method according to claim 1, wherein the desired deceleration ($a_{desired}$) depends reciprocally on the vehicle distance (d).

7. The method according to claim 1, wherein the desired deceleration ($a_{desired}$) depends reciprocally on the speed ($v_1$) of the leading vehicle.

8. The method according to claim 1, wherein the desired deceleration ($a_{desired}$) can be represented as a function of the change in speed ($a_1$) of the leading vehicle.

9. The method according to claim 1, wherein the desired deceleration ($a_{desired}$) can be represented in accordance with the rule $$a_{desired}=(v_2-v_1)^2/(d_{nominal}-d)\pm a_1+C,$$

wherein $a_{desired}$ denotes the desired deceleration, $v_1$ denotes the speed of the leading vehicle, $v_2$ denotes the speed of the following vehicle, $a_1$ denotes the change in speed of the leading vehicle, d denotes the vehicle distance, $d_{nominal}$ denotes a given or determined nominal distance, and C denotes a constant.

10. The method according to claim 9, wherein nominal distance ($d_{nominal}$) is determined as a function of the speed ($v_1$) of the leading vehicle in accordance with the relationship $$d_{nominal}=k_1*v_1+k_2,$$

wherein $k_1$, $k_2$ denote constants.

11. The method according to claim 9 wherein the desired deceleration ($a_{desired}$) is determined only for the case in which the speed ($v_2$) of the following vehicle overshoots the speed ($v_1$) of the leading vehicle.

12. The method according to claim 1, wherein the desired deceleration ($a_{desired}$) is set to a constant maximum value ($a_{max}$) for the case in which the vehicle distance (d) undershoots a lower limit value ($d_{min}$).

13. The method according to claim 12, wherein the lower vehicle distance limit value ($d_{min}$) is fixed at the nominal distance ($d_{nominal}$).

14. The method according to claim 14, wherein the automatic braking operation is performed independently of a brake actuation triggered by the driver.

15. The method according to claim 14, wherein in that a desired brake pressure which forms the basis of the brake pressure control determined from the desired deceleration ($a_{desired}$).

16. A control system for a vehicle, in particular for carrying out the method according to claim 1, having a measuring device for measuring the distance (d) between a following vehicle and a leading vehicle driving in front, and for measuring the speeds ($v_1$, $v_2$) of the leading vehicle and the following vehicle, having a regulation and control unit for generating actuating signals as a function of the measuring signals of the measuring device, a desired deceleration ($a_{desired}$) being determined for the following vehicle in the event of at least one of undershooting of a minimum distance (d) and overshooting of a minimum speed difference, said actuating signals adjusting a braking device, for automatically braking the following vehicle, wherein the desired deceleration ($a_{desired}$) is compared with a threshold value ($a_{desired,S}$) in a comparison unit of the regulation and control unit, and in that the automatic braking device is activated only for the case in which the absolute value of the desired deceleration ($a_{desired}$) overshoots the threshold value ($a_{desired,S}$).

17. The control system according to claim 16, wherein the regulation and control unit comprises a speed control unit and an automatic braking unit, it being possible for a switchover signal to be generated as a function of the absolute value of the desired deceleration ($a_{desired}$) in order to switch over between the speed control unit and the automatic braking unit.

* * * * *